United States Patent
Schmidt et al.

(10) Patent No.: US 12,128,829 B2
(45) Date of Patent: Oct. 29, 2024

(54) DISPLAY ASSEMBLY WITH TRANSPARENT COVER AND PIXEL MATRIX DISPLAY FIXED THERETO IN AN IMPROVED MANNER, AND ASSOCIATED MOUNTING METHOD

(71) Applicant: Preh GmbH, Bad Neustadt a.d. Saale (DE)

(72) Inventors: Thomas Schmidt, Huenfeld (DE); Michael Martin, Unsleben (DE)

(73) Assignee: Preh GmbH, Bad Neustadt a.d. Saale (DE)

( * ) Notice: Subject to any disclaimer, the term of this patent is extended or adjusted under 35 U.S.C. 154(b) by 138 days.

(21) Appl. No.: 18/001,935

(22) PCT Filed: Jun. 24, 2021

(86) PCT No.: PCT/EP2021/067399
§ 371 (c)(1),
(2) Date: Dec. 15, 2022

(87) PCT Pub. No.: WO2022/008260
PCT Pub. Date: Jan. 13, 2022

(65) Prior Publication Data
US 2023/0271564 A1    Aug. 31, 2023

(30) Foreign Application Priority Data

Jul. 8, 2020 (DE) .......................... 102020118044.6

(51) Int. Cl.
*B60R 11/02* (2006.01)
*B60R 11/00* (2006.01)

(52) U.S. Cl.
CPC ... *B60R 11/0235* (2013.01); *B60R 2011/0052* (2013.01); *B60R 2011/0071* (2013.01); *B60R 2011/0077* (2013.01)

(58) Field of Classification Search
CPC ......... B60R 11/0235; B60R 2011/0052; B60R 2011/0071; B60R 2011/0077; G09F 9/30; G09F 9/35; G09F 9/33; G09F 9/335
See application file for complete search history.

(56) References Cited

U.S. PATENT DOCUMENTS 8,172,097 B2 * 5/2012 Nearman ............. H05K 9/0054
                                                211/189
2013/0265504 A1  10/2013  Sato et al.
2019/0001637 A1   1/2019  Ito et al.

FOREIGN PATENT DOCUMENTS

DE    102016215299 A1    2/2018
DE    102017205959 A1   10/2018
(Continued)

OTHER PUBLICATIONS

German Office Action for Application No. 10 2020 118 044.6, dated Mar. 3, 2021.
(Continued)

*Primary Examiner* — Eret C McNichols
(74) *Attorney, Agent, or Firm* — M&B IP Analysts, LLC (57) ABSTRACT

The present disclosure relates to a display arrangement, including: a cover that is transparent at least in some regions; a support frame adapted to fix the display arrangement on a supporting structure; a pixel matrix display having a display surface; a housing; wherein the support frame is arranged adjacent to the cover and an intermediate space, which is delimited by the support frame and the cover, is formed and is filled with a thermoplastic elastomer; wherein the cover and the support frame form a well, in which the pixel matrix display is accommodated; wherein a transparent adhesive layer is formed in the well between the display surface and the cover to fix the pixel matrix display on the cover, with the display surface being visible through the cover and the
(Continued)

adhesive layer; wherein the housing fits over the pixel matrix display and is fixed on the support frame.

23 Claims, 5 Drawing Sheets

(56) References Cited

FOREIGN PATENT DOCUMENTS

| | | |
|---|---|---|
| EP | 3150442 A1 | 4/2017 |
| EP | 3243703 A1 | 11/2017 |
| EP | 3132911 B1 | 11/2018 |
| EP | 3473498 A1 | 4/2019 |
| WO | 2010115585 A1 | 10/2010 |
| WO | 2015197664 A1 | 12/2015 |
| WO | 2018222978 A1 | 12/2018 |

OTHER PUBLICATIONS

International Search Report and Written Opinion of International Searching Authority for PCT/EP2021/067399, ISA/EP, Rijswijk, Netherlands, Dated: Sep. 29, 2021.

* cited by examiner

DISPLAY ASSEMBLY WITH TRANSPARENT COVER AND PIXEL MATRIX DISPLAY FIXED THERETO IN AN IMPROVED MANNER, AND ASSOCIATED MOUNTING METHOD

The present disclosure relates to a display arrangement comprising a transparent cover and a pixel matrix display, which is arranged thereunder from the viewpoint of the viewer, in particular for use in a motor vehicle, for example in the outer area of a motor vehicle body. With pixel matrix displays arranged under a transparent cover there is often the problem that the display surface of the pixel matrix display should be arranged as close as possible to the display surface to avoid boundary surfaces that produce reflections. For example, a layer of air between the cover and the display surface should be avoided because the boundary surfaces from the optically denser medium to the optically thinner medium and vice versa in each case cause reflections that impair the viewing from the viewpoint of the operator. For this reason, the display surface is often coupled to the cover by way of a layer, such as an adhesive layer, which has an optical refractive index identical or approximately identical to the material of the cover. This loses the mechanical advantage of the layer of air, which at least largely isolates the pixel matrix display from mechanical effects, because the adhesive is generally impact resistant when it sets. What is more, because a liquid adhesive is usually used for producing the coupling, there are recurrent difficulties insofar as losses of liquid adhesive lead to an uneven formation of the adhesive layer. When the display surface of the pixel matrix display is coupled directly to the cover there is the risk of a force acting on the cover if the pixel matrix display is in the path of the force, and so there is irreversible damage to the pixel matrix display.

Against this background there was the need for a display arrangement of the type in question that has the advantage of a reflection-free optical coupling between the cover and the display surface of an associated pixel matrix display, but at the same time reliable fastening is provided by a uniform adhesive layer and on the other hand the pixel matrix display is not exposed to the increased risk of mechanical damage.

There was correspondingly the need for an associated mounting method by which such a display arrangement can be created. This object is achieved by a mounting method according to claim 1 and by a display arrangement of the alternative independent claim. An equally advantageous use is the subject of the use claim. Advantageous refinements are respectively the subject of the dependent claims. It should be pointed out that the features specified individually in the claims can be combined with one another in any desired, technically appropriate way, and can indicate further refinements of the present disclosure. The description, in particular in conjunction with the figures, additionally characterizes and specifies the present disclosure.

The present disclosure relates to a method for mounting a display arrangement in which, in an arranging step, a support frame and a cover that is transparent at least in some regions are arranged such that the support frame is adjacent to the cover while forming an intermediate space, which defines a hollow space and is delimited by the support frame and the cover. At the same time, the cover and the support frame form a well for accommodating a pixel matrix display having a display surface. Preferably, the intermediate space forming the hollow space extends around the well and more preferably encloses it completely. For example, the support frame has a central aperture, so that the support frame that peripherally surrounds the aperture defines the inner wall of the well that is facing the aperture. For example, a bottom of the well is formed by the cover. Preferably, the support frame is formed from a fiber-reinforced plastic, more preferably from a fiber-reinforced thermoplastic.

According to the present disclosure, the support frame is designed for fixing the display arrangement on a supporting structure, in particular on a motor vehicle body. For example, the support frame has latching means or means for screw fastening, such as apertures or threaded bores.

In a subsequent step, injecting a thermoplastic elastomer into the hollow space defined by the intermediate space takes place in order to fill it with the thermoplastic elastomer, preferably to fill it completely. By subsequently solidifying the thermoplastic elastomer, the support frame is fixed on the cover by a material-bonding connection, while a residual elasticity that remains permanently after the solidifying process provides a permanent and robust connection with a sealing effect between the cover and the support frame.

This is followed in a subsequent step by filling the well with a transparently curing liquid adhesive to form an adhesive layer, with the sealing effect of the thermoplastic elastomer in the hollow space making sure that a loss of liquid adhesive is prevented. It is preferably an acrylate-based liquid adhesive or a 2-component silicone adhesive.

Preferably, during the filling of the well with the liquid adhesive, the liquid adhesive wets the support frame, in particular the inner wall of the well formed by it; preferably, the inner wall of the well is wetted by the liquid adhesive on all sides. For example, the amount of liquid adhesive that is introduced is chosen such that, when the liquid adhesive is distributed in the well, possibly of its own accord, a substantially even filling level in the well is achieved, with the inner wall of the well wetted on all sides.

This is followed according to the present disclosure by introducing the pixel matrix display into the well, with the display surface of the pixel matrix display facing the adhesive layer, and being completely wetted by the liquid adhesive of the adhesive layer. This wetting may be electrostatically assisted, for example when using a polar liquid adhesive. In a subsequent step, curing of the adhesive takes place. This is understood as meaning chemical and/or physical curing of the adhesive, such as increasing crosslinkage of the adhesive. It is for example a radiation-curing adhesive, such as a UV-curing adhesive, so that, by means of appropriate irradiation, the adhesive is cured through the cover.

The curing achieves the effect that the pixel matrix display is fixed on the cover by way of the display surface, while as a result of the transparency of the cover and the layers lying in between, such as the adhesive layer, the display surface remains visible through the cover and the adhesive layer. Preferably, the pixel matrix display is fixed exclusively by way of the display surface, i.e. is consequently fixed on the cover in a "freely suspended" manner. As far as the pixel matrix display is concerned, the present disclosure is not restricted. It is for example a so-called touchscreen, that is to say a combination of a pixel matrix display and a location-sensitive touch sensor system, such as a capacitive location-sensitive touch sensor system. For example, the pixel matrix display is a liquid crystal display of a twisted nematic construction, a super-twisted nematic construction, a double super-twisted nematic construction, a triple super-twisted nematic construction, a vertical alignment construction or an in-plane switching construction. The display surface is in each case a component part of the outer surface of the pixel matrix display and is for example defined by the outermost layer of the pixel matrix display, which is usually created in a layered construction. Depending on the type of construction, it is for example an electrode-bearing, transparent top layer or a transparent protective layer or the like. Alternatively, the transparent electrode structure provided for the location-sensitive, capacitive touch detection may also be a component part of the cover and for example be applied to the surface facing the pixel matrix display.

The fact that the support frame serves for fixing the display arrangement on a supporting structure means that, when a force acts on the cover, it is ensured that the pixel matrix display is arranged outside the flux of the force. Mechanical clamping of the pixel matrix display between the cover and a supporting structure, such as the motor vehicle body, is prevented. This largely minimizes the risk of damage to the pixel matrix display. This applies all the more if, according to a preferred refinement, the support frame serves exclusively for fixing the display arrangement on the supporting structure.

In a step following the curing process, according to a preferred embodiment of the method according to the present disclosure a housing that fits over the pixel matrix display is fixed on the support frame, that is to say touching contact between the pixel matrix display and the housing is avoided. The housing serves for the mechanical protection of the pixel matrix display. In order to avoid the penetration of foreign bodies or fluids, according to a preferred refinement a sealant is provided between the housing and the support frame. The sealant is for example a rubber material, a natural rubber material or a thermoplastic elastomer.

For easier mounting, according to a preferred variant of the mounting method the housing is fixed on the support frame by latching of latching means.

According to a preferred variant of the method according to the present disclosure, at least one further decorative and/or fastening element, which serves for example for fixing further components on the cover or else is provided for fixing the display arrangement on a supporting structure, is fixed on the cover outside the well by means of a layer of the thermoplastic elastomer that is formed during the injecting and solidifying process.

The cover is for example a layer of a transparent plastic, such as a thermoplastic; preferably, the cover comprises a glass material. More preferably, the cover is a toughened safety glass, i.e. a tempered glass in accordance with EN 12150-1, or a laminated glass. The latter is a composite of two or more flat panes of glass which are connected by a film of plastic, usually a comparatively tear-resistant and tough-elastic film.

According to a preferred embodiment of the method, the support frame is produced from a plastic, such as a thermoplastic, preferably a fiber-reinforced plastic. Preferably, the support frame is produced in a previous step in an injection-molding process, preferably in a 2-component injection-molding process. For example, the support frame and the sealant are extruded in a joint shaping 2-component injection-molding step while producing a material-bonding connection between the two.

In the case of a preferred embodiment of the method according to the present disclosure, in a last step the support frame is fixed on a motor vehicle body, with the pixel matrix display having no touching contact with the motor vehicle body in the fixed position.

The present disclosure also relates to a display arrangement which has a cover that is transparent at least in some regions. The cover is for example a layer of a transparent plastic, such as a thermoplastic; preferably, the cover comprises a glass material. Still more preferably, the cover is a toughened safety glass, i.e. a tempered glass in accordance with EN 12150-1, or a laminated glass. The latter is a composite of two or more flat panes of glass which are connected by a film of plastic, usually a comparatively tear-resistant and tough-elastic film.

The display arrangement according to the disclosed embodiments also has a support frame for fixing the display arrangement on a supporting structure, in particular on a motor vehicle body. Preferably, the support frame is formed by a fiber-reinforced plastic, more preferably by a fiber-reinforced thermoplastic. According to the invention, the support frame is designed for fixing the display arrangement on a supporting structure, in particular on a motor vehicle body. For example, the support frame has latching means or means for screw fastening, such as apertures or threaded bores.

The display arrangement according to the disclosed embodiments also has a pixel matrix display having a display surface. As far as the pixel matrix display is concerned, the present disclosure is not restricted. It is for example a so-called touchscreen, that is to say a combination of a pixel matrix display and a location-sensitive touch sensor system, such as a capacitive location-sensitive touch sensor system. For example, the pixel matrix display is a liquid crystal display of a twisted nematic construction, a super-twisted nematic construction, a double super-twisted nematic construction, a triple super-twisted nematic construction, a vertical alignment construction or an in-plane switching construction. The display surface is in each case a component part of the outer surface of the pixel matrix display and is for example defined by the outermost layer of the pixel matrix display, which is usually created in a layered construction. Depending on the type of construction, it is for example an electrode-bearing, transparent top layer or a transparent protective layer or the like. Alternatively, the transparent electrode structure provided for the location-sensitive, capacitive touch detection may also be a component part of the cover and for example be applied to the surface facing the pixel matrix display.

The display arrangement according to the disclosed embodiments optionally has a housing.

According to the present disclosure, the support frame is arranged adjacent to the cover. In this case, an intermediate space, which is delimited by the support frame and the cover, is formed and is filled, preferably completely filled, with a thermoplastic elastomer in order to fix the support frame on the cover. What is more, the cover and the support frame form a well for accommodating the pixel matrix display. For example, the support frame has a central aperture, so that the support frame that peripherally surrounds the aperture defines the inner wall of the well that is facing the aperture. For example, a bottom of the well is formed by the cover. Preferably, the intermediate space extends around the well, more preferably the intermediate space encloses the well completely.

According to the present disclosure, a transparent adhesive layer is formed in the well between the display surface and the cover in order to fix the pixel matrix display on the cover, with the display surface being visible through the cover and the adhesive layer. Preferably, the pixel matrix display is only fastened by way of its display surface and is consequently fixed on the cover in a freely suspended manner. The optional housing, if present, is in this case fixed on the support frame such that it fits over the pixel matrix display.

The fact that the support frame serves for fixing the display arrangement on a supporting structure means that, when a force acts on the cover, it is ensured that the pixel matrix display is arranged outside the flux of the force. Mechanical clamping of the pixel matrix display between the cover and a supporting structure, such as the motor vehicle body, is prevented. The risk of damage to the pixel matrix display is minimized. This applies all the more if, according to a preferred refinement, the support frame serves exclusively for fixing on the supporting structure.

In the case of a preferred embodiment of the display arrangement, a sealant is provided between the housing and the support frame. The sealant is for example a rubber material, a natural rubber material or a thermoplastic elastomer.

According to a preferred embodiment of the display arrangement according to the disclosed embodiments, at least one further decorative and/or fastening element, which is arranged outside the well and is fixed on the cover by means of a layer of thermoplastic material, is also provided.

For example, this further decorative and/or fastening element serves along with the support frame for fastening the display arrangement on a supporting structure, in particular on a motor vehicle body, or serves for fixing another component on the cover.

It is preferably provided that the adhesive layer is adjacent to the support frame, more preferably to the surface forming the inner wall of the well, preferably on all sides.

According to a preferred variant of the display arrangement according to the disclosed embodiments including the optional housing, the optional housing is fixed on the support frame by latching means.

The present disclosure also relates to the advantageous use of the display arrangement in one of the described embodiments on a motor vehicle, in particular in an outer area of the motor vehicle body. Preferably, the display arrangement is arranged alongside an opening in the body, for example a door, such as in a B pillar of the motor vehicle.

The various embodiments are explained in more detail with the aid of the following figures. In this case, the figures should be understood as merely exemplary and simply represent a preferred embodiment variant in each case.

Figure 1:
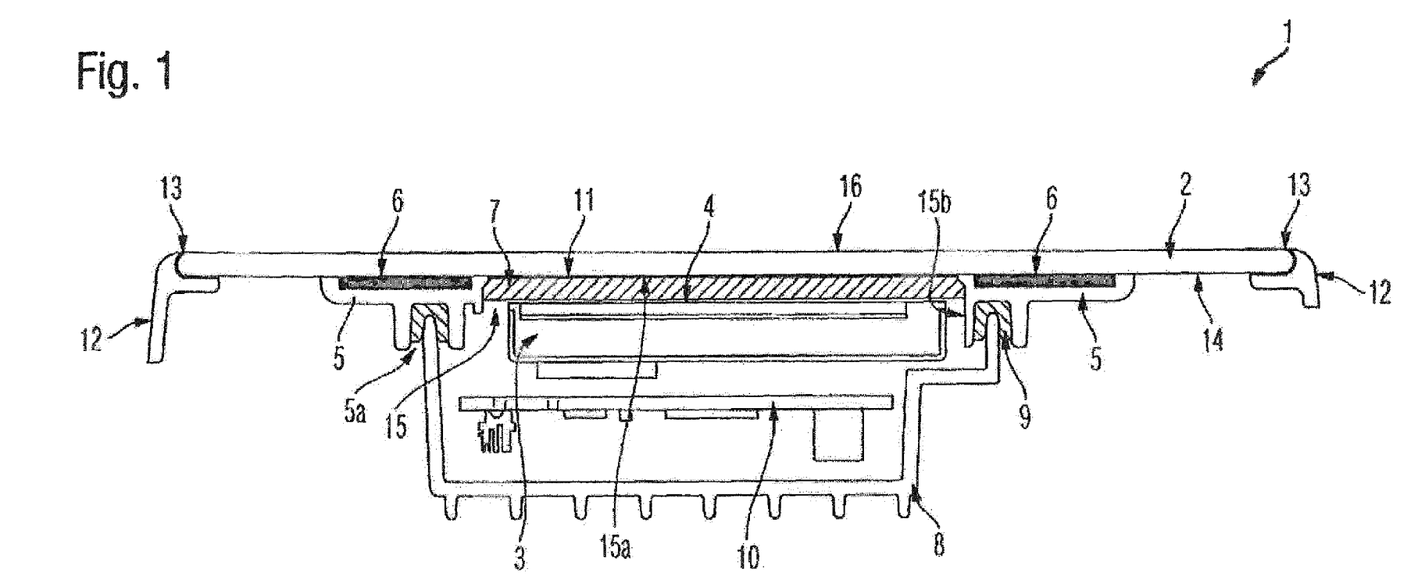
FIG. 1 shows a schematic sectional view of an embodiment of the display arrangement according to an embodiment.

FIG. 1 shows an embodiment of the display arrangement 1 according to the embodiment. It has a cover 2, which is transparent at least in some regions. The cover 2 is a toughened safety glass, i.e. a tempered glass in accordance with EN 12150-1, or a laminated glass. The latter is a composite of two or more flat panes of glass which are connected by a film of plastic. The cover 2 is mounted on a motor vehicle that is not shown in the area of the B pillar, with the surface 16 of the cover 2 defining an outer surface of the motor vehicle and the surface 14 of the cover 2 facing the body or the passenger compartment of the vehicle. The display arrangement 1 according to the embodiment also has a support frame 2 for fixing the display arrangement 1 on the motor vehicle body. The support frame 4 is formed from a fiber-reinforced thermoplastic and has means that are not shown any more specifically for fixing on the motor vehicle body, such as latching means or means for screw fastening, such as apertures or threaded bores.

The display arrangement 1 according to the embodiment also has a pixel matrix display 3 having a display surface 4. As far as the technology used for image generation of the pixel matrix display 3 is concerned, the present disclosure is not restricted. The display surface 4 is in each case a component part of the outer surface of the pixel matrix display 3 and is for example defined by the outermost layer of the pixel matrix display 3, which is usually created in a layered construction. A transparent electrode structure 11 provided for the location-sensitive, capacitive touch detection is a component part of the cover 2 and is applied as a coating of a film substrate to the surface 14 facing the pixel matrix display 3 of the innermost glass layer of the cover 2 that is facing the vehicle.

The display arrangement 1 according to the embodiment also has a housing 8, which is formed such that it fits over the pixel matrix display 3 and evaluation electronics arranged on a printed circuit board 10 and is fixed on the support frame 5 by way of the sealants 9 and latching means that are not shown. Formed for this purpose in the support frame 5 is a groove 5a, in which the housing 8 engages. The support frame 5 for its part is arranged adjacent to the cover 2, specifically adjacent to the surface 14 of the cover 2 that is facing the pixel matrix display 3. In this case, an intermediate space 6, which is delimited by the support frame 5 and the cover 2, is formed and is filled, preferably completely filled, with a thermoplastic elastomer in order to fix the support frame 5 on the cover 2. The cover 2 and the support frame 5 form a well 15 for accommodating the pixel matrix display 3. For instance, the support frame 5 has a central aperture, with the support frame 5 that peripherally surrounds the aperture defining an inner wall 15b of the well 15 that is facing the aperture. The bottom 15a of the well 15 is formed by the cover 2. The intermediate space 6 filled with the thermoplastic elastomer extends around the well 15, so that the latter is completely enclosed by the intermediate space 6 and has a sealing effect in order to prevent the penetration of fluid into the well 15 and the pixel matrix display 3 located there.

A transparent adhesive layer 7 is formed in the well 15 between the display surface 4 of the pixel matrix display 3 and the cover 2 in order to fix the pixel matrix display 3 on the cover 2 in a material-bonding manner, with the display surface 4 being visible through the cover 2 and the adhesive layer 7 as a result of their optical transparency. The adhesive layer 7 extends fully over the display surface 4 between the opposing inner walls 15b of the well 15. The pixel matrix display 3 is in this case only fastened by way of its display surface 4 and is consequently fixed on the cover 2 in a freely suspended manner.

The fact that the support frame 5 serves for fixing the display arrangement 1 on the supporting structure, here the vehicle body, means that, when a force acts on the cover 2, it is ensured that the pixel matrix display 3 is arranged outside the flux of the force. Mechanical clamping of the pixel matrix display 3 between the cover and the supporting structure, such as the motor vehicle body, is prevented. This largely eliminates damage to the pixel matrix display 3.

Provided along with the support frame 5 are further decorative and/or fastening elements 12, which are arranged outside the well 15 and are fixed on the cover 2 by means of a layer 13 likewise of thermoplastic material. These decorative and/or fastening elements 12 serve here as trim for covering the gap at the B pillar of the motor vehicle.

An embodiment of the mounting method according to the embodiment is explained with reference to FIGS. 2 to 5.

Figure 2:
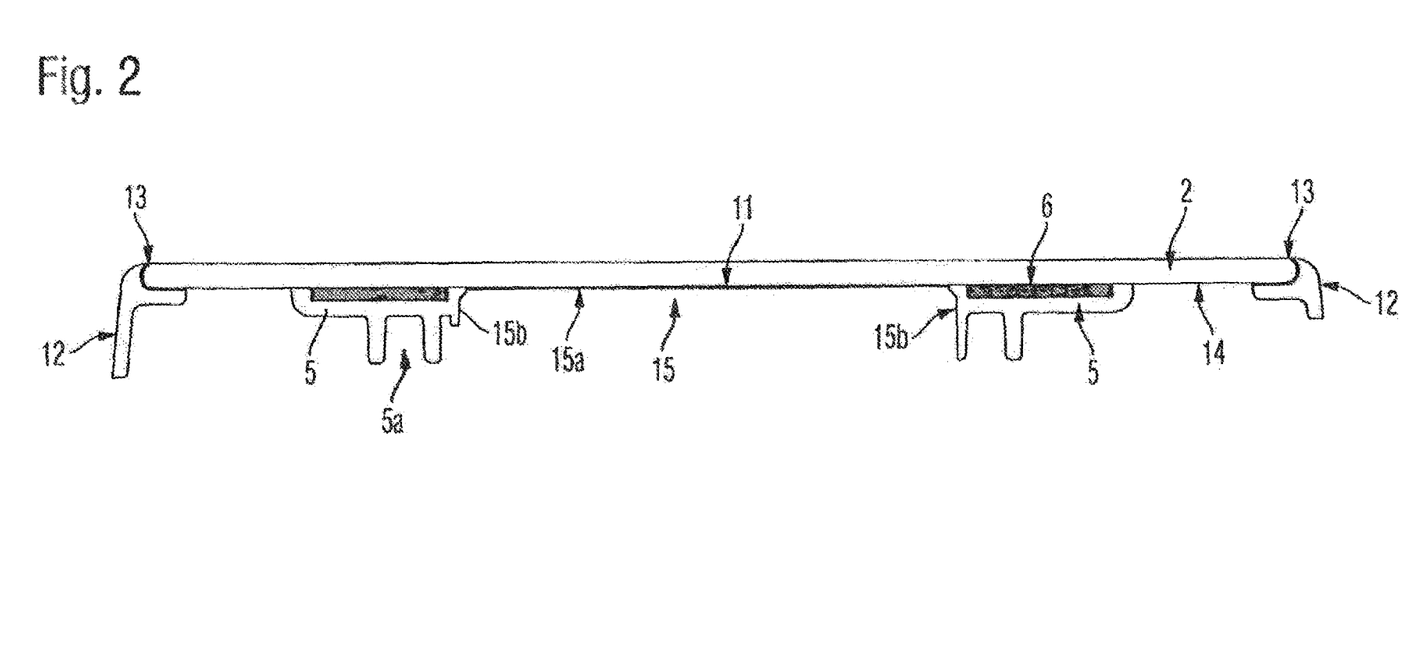
FIG. 2 shows a schematic sectional view for explaining the arrangement of the support frame on the cover and introducing the thermoplastic elastomer according to the mounting method according to the embodiment.

In the arranging step shown in FIG. 2, a support frame 5 and a cover 2 that is transparent at least in some regions are arranged such that the support frame 5 is adjacent to the cover 2 while forming an intermediate space 6, which defines a hollow space and is delimited by the support frame 5 and the cover 2. At the same time, the cover 2 and the support frame 5 of fiber-reinforced thermoplastic form a well 15, which serves for accommodating the pixel matrix display not shown in FIG. 2. The intermediate space 6 forming the hollow space extends around the well 15 and encloses it completely. The support frame 2 has a central aperture, so that the support frame 5 that peripherally surrounds the aperture defines an inner wall 15*b* of the well 15 that is facing the aperture, while a bottom 15*a* of the well 15 is formed by the cover 2. The cover 2 is a toughened safety glass, i.e. a tempered glass in accordance with EN 12150-1, or a laminated glass. A transparent electrode structure 11 provided for the location-sensitive, capacitive touch detection is a component part of the cover 2 and is applied as a coating of a transparent film substrate to the surface 14 facing the pixel matrix display 3 of the glass layer of the cover 2.

The support frame 5 is intended and designed for fixing the display arrangement 1 on a motor vehicle body, here the B pillar of a motor vehicle body. In a step following the arranging process, injecting a thermoplastic elastomer into the hollow space defined by the intermediate space 6, already shown in FIG. 2, takes place in order to fill it completely with the thermoplastic elastomer. By subsequent solidifying of the thermoplastic elastomer, the support frame 5 is fixed on the cover 2 by a material-bonding connection, while a residual elasticity that remains permanently after the solidifying process provides a permanent and robust connection with a sealing effect between the cover 2 and the support frame 5. At the same time, further decorative and/or fastening elements 12 are fixed on the cover, but outside the well 15, by means of the thermoplastic elastomer. These decorative and/or fastening elements 12 serve here as trim for covering the gap at the B pillar of the motor vehicle.

Figure 3:
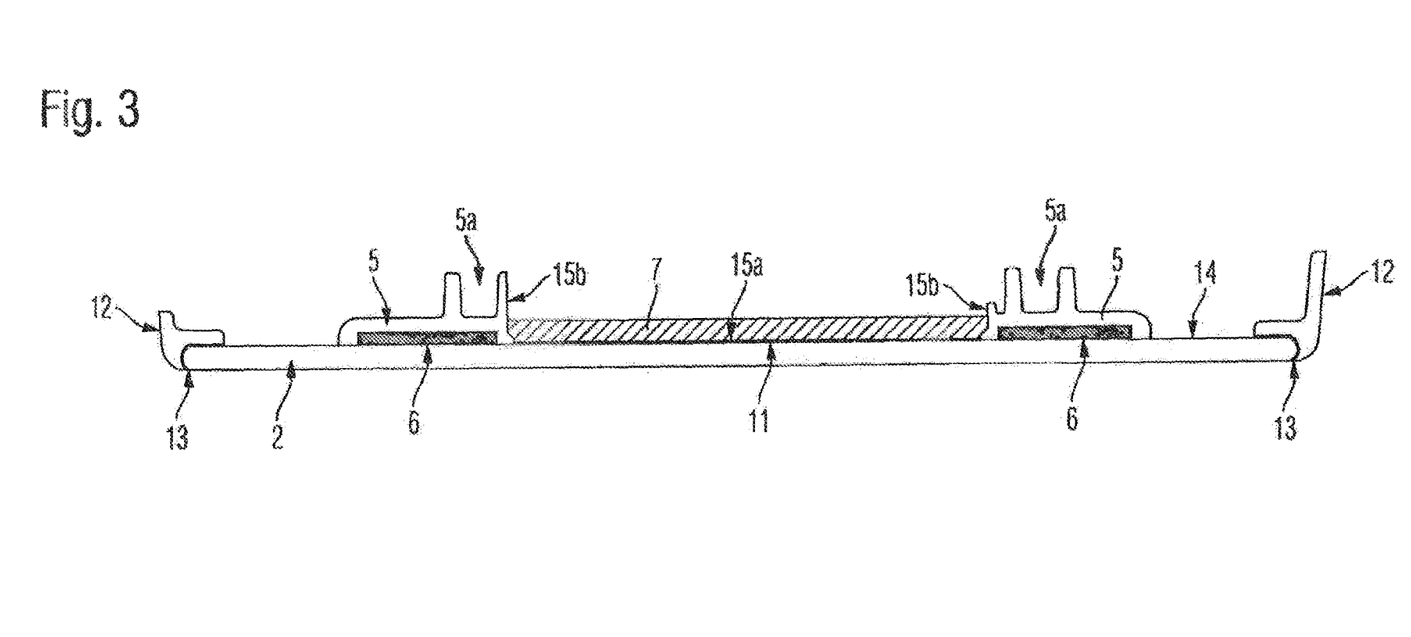
FIG. 3 shows a schematic sectional view for explaining the filling of the well with a liquid adhesive according to the mounting method according to the embodiment.

This is followed in a subsequent step, shown in FIG. 3, by filling the well 15 with a transparently curing liquid adhesive to form an adhesive layer 7, with the sealing effect of the thermoplastic elastomer in the intermediate space 6 making sure that a loss of liquid adhesive is prevented. The liquid adhesive is for example an acrylate-based liquid adhesive or a 2-component silicone adhesive.

During the filling of the well 15 with the liquid adhesive, the liquid adhesive wets the support frame 5, specifically the inner wall 15*b* of the well 15 formed by it, on all sides because the amount of liquid adhesive that is introduced is chosen such that, when the liquid adhesive is distributed in the well 15, a substantially even filling level in the well 15 is achieved until the inner wall 15*b* of the well 15 is wetted on all sides and the transparent adhesive layer 7 is formed.

Figure 4:
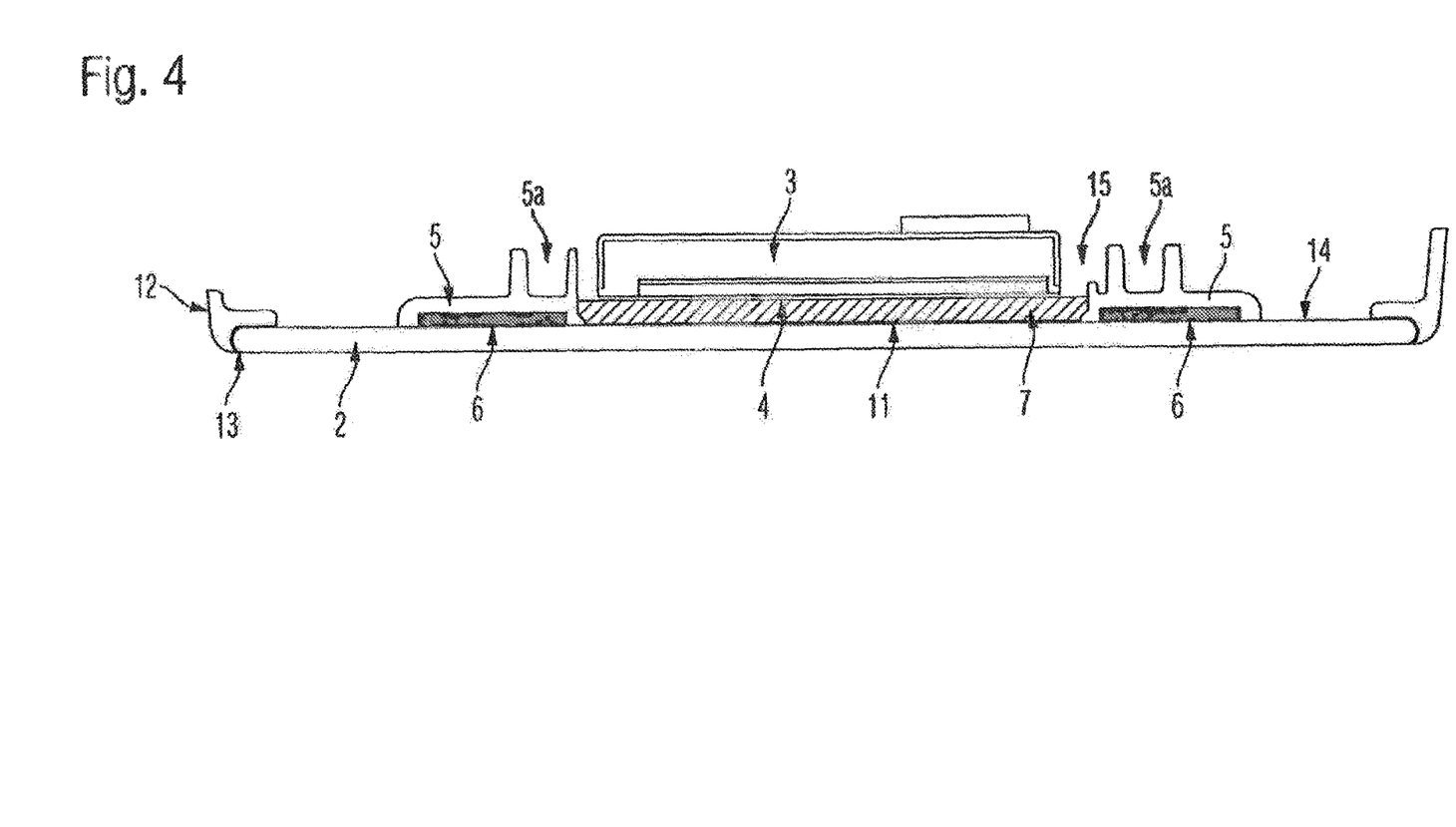
FIG. 4 shows a schematic sectional view for explaining the adhesive bonding of the pixel matrix display to the cover according to the mounting method according to the embodiment.

This is followed by introducing the pixel matrix display 3 into the well 15, shown in FIG. 4, with the display surface 4 facing the adhesive layer 7 and being wetted over its entire surface area by the liquid adhesive of the adhesive layer 7. When the adhesive layer is subsequently cured by chemical or physical crosslinkage of the liquid adhesive, this achieves the effect that on the one hand the pixel matrix display 3 is fixed on the cover 2 by way of the display surface 4 and on the other hand the display surface 4 is visible through the cover 2 and the adhesive layer 4. The pixel matrix display 3 is in this case fixed exclusively by way of the display surface 4, i.e. is consequently fixed on the cover 2 in a "freely suspended" manner.

The fact that the support frame 5 serves for fixing the display arrangement 1 on the vehicle body means that, when a force acts on the cover 2, it is ensured that the pixel matrix display 3 is arranged outside the flux of the force. Mechanical clamping of the pixel matrix display 3 between the cover 2 and the motor vehicle body is prevented. This largely eliminates damage to the pixel matrix display 3.

Figure 5:
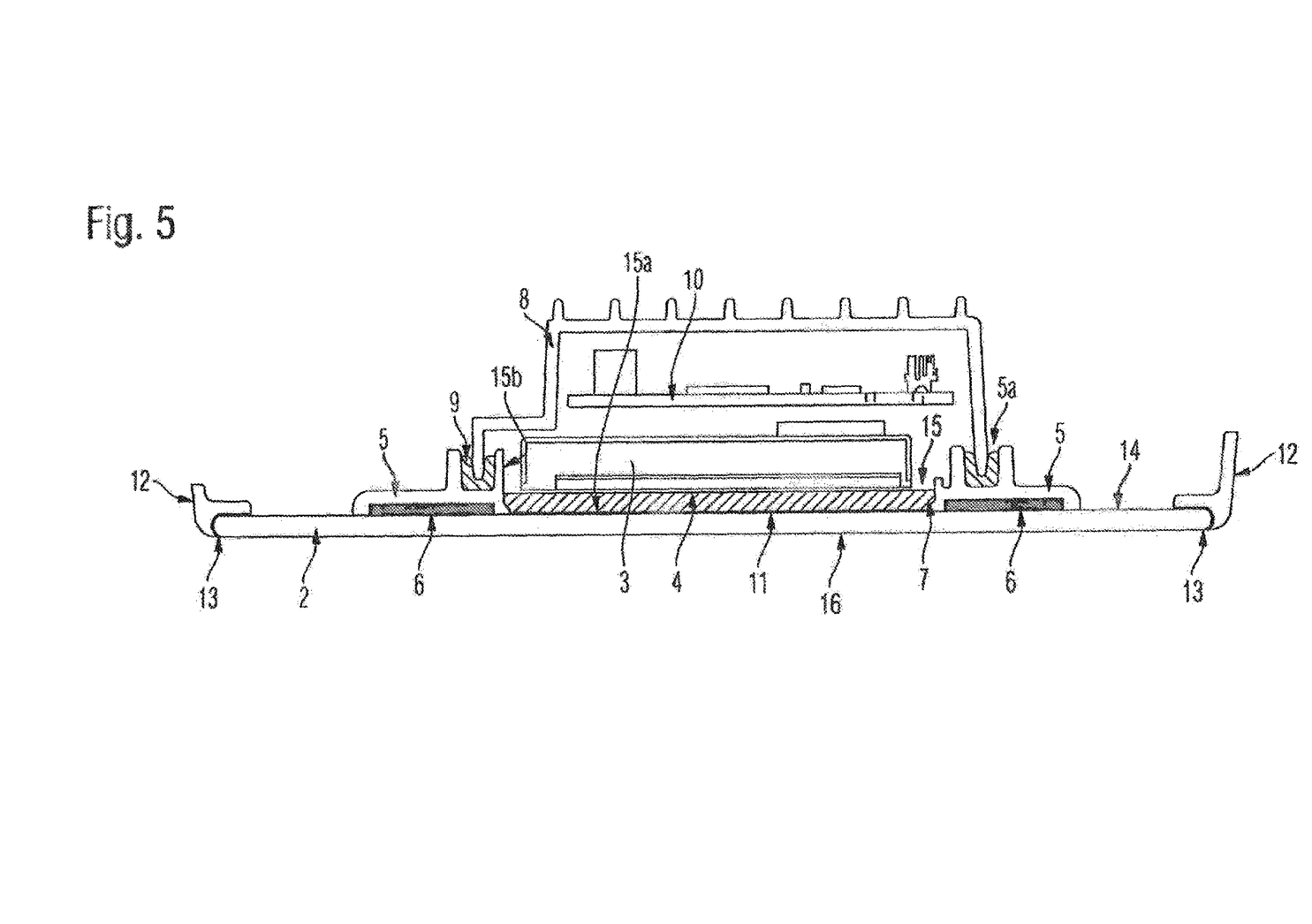
FIG. 5 shows a schematic sectional view for explaining the fixing of the housing to the support frame according to the mounting method according to the embodiment.

In a step, shown in FIG. 5, following the curing process, a housing 8 is fixed on the support frame 5. The housing 8 in this case fits over the pixel matrix display 3 and evaluation electronics arranged on a printed circuit board 10. The housing 8 is fixed on the support frame 5 by way of sealants 9 and latching means that are not shown. The sealant 9 is a layer of a thermoplastic elastomer which is provided on the flanks of a groove 5*a* of the support frame 5 and serves for avoiding the penetration of foreign bodies or fluids. The sealant 9 and the support frame 5 are produced in a 2-component injection-molding process in a shaping extrusion step while producing a material-bonding connection between the two. The housing 8 serves for the mechanical protection of the pixel matrix display 3 and the evaluation electronics also located thereunder.

What is claimed is:

1. A method for mounting a display arrangement, comprising:
    arranging a support frame and a cover that is transparent at least in some regions in such a way that the support frame is adjacent to the cover while forming an intermediate space, which defines a hollow space and is delimited by the support frame and the cover, and the cover and the support frame form a well, wherein the well is adapted to accommodate a pixel matrix display having a display surface; wherein the support frame is adapted to fix the display arrangement on a supporting structure;
    injecting a thermoplastic elastomer into the intermediate space;
    solidifying the thermoplastic elastomer in order to fix the support frame on the cover;
    filling the well with a transparently curing liquid adhesive to form an adhesive layer;
    introducing the pixel matrix display into the well, with the display surface facing the adhesive layer and being wetted over its entire surface area by the liquid adhesive of the adhesive layer and the display surface being visible through the cover and the adhesive layer;
    curing the adhesive layer to bring about fixing of the pixel matrix display on the cover by way of the adhesive layer.

2. The method as claimed in claim 1, further comprising: fixing a housing that fits over the pixel matrix display on the support frame.

3. The method as claimed in claim 2, wherein a sealant is provided between the housing and the support frame.

4. The method as claimed in claim 2, wherein the housing is fixed on the support frame by a latch.

5. The method as claimed in claim 1, wherein the intermediate space is formed peripherally around the well.

6. The method as claimed in claim 1, further comprising: fixing at least one of: a decorative element and a fastening element on the cover outside the well by a layer of the thermoplastic elastomer that is formed during the injecting and the solidifying of the thermoplastic elastomer.

7. The method as claimed in claim 1, wherein the cover comprises a glass material.

8. The method as claimed in claim 1, wherein the support frame is produced from any one of: a plastic and a thermoplastic.

9. The method as claimed in claim 1, wherein, during the filling of the well with the liquid adhesive, the liquid adhesive wets the support frame.

10. The method as claimed in claim 1, wherein the support frame is produced in an injection-molding process.

11. The method as claimed in claim 1, fixing the support frame on a motor vehicle body, without the pixel matrix display having any touching contact with the motor vehicle body.

12. The method as claimed in claim 1, wherein the support frame is produced from a fiber-reinforced plastic.

13. The method as claimed in claim 1, wherein the support frame is produced in a 2-component injection-molding process.

14. A display arrangement comprising:
a cover that is transparent at least in some regions;
a support frame, which is adapted to fix the display arrangement on a supporting structure;
a pixel matrix display having a display surface;
a housing;
wherein the support frame is arranged adjacent to the cover and an intermediate space, which is delimited by the support frame and the cover, is formed, wherein the intermediate space is filled with a thermoplastic elastomer to fix the support frame on the cover;
wherein the cover and the support frame form a well, in which the pixel matrix display is accommodated; wherein a transparent adhesive layer is formed in the well between the display surface and the cover to fix the pixel matrix display on the cover, with the display surface being visible through the cover and the adhesive layer; wherein the housing fits over the pixel matrix display and is fixed on the support frame.

15. The display arrangement as claimed in claim 14, wherein a sealant is provided between the housing and the support frame.

16. The display arrangement as claimed in claim 14, wherein at least one of: a decorating element and a fastening element arranged outside the well is fixed on the cover by a layer of the thermoplastic elastomer.

17. The display arrangement as claimed in claim 14, wherein the cover comprises a glass material.

18. The display arrangement as claimed in claim 14, wherein the support frame is produced by any one of: a plastic and a thermoplastic.

19. The display arrangement as claimed in claim 14, the adhesive layer is adjacent to the support frame.

20. The display arrangement as claimed in claim 14, wherein the housing is fixed on the support frame by a latch.

21. The display arrangement as claimed in claim 14, wherein the intermediate space is formed peripherally around the well.

22. The display arrangement as claimed in claim 14, wherein the display arrangement is used on a motor vehicle, in particular in an outside area of the motor vehicle body.

23. The display arrangement as claimed in claim 14, wherein the support frame is produced by a fiber reinforced plastic.

* * * * *